US012689207B2

(12) United States Patent
Masuda et al.

(10) Patent No.: US 12,689,207 B2
(45) Date of Patent: Jul. 21, 2026

(54) POWER SUPPLY CONTROL APPARATUS

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Ryosuke Masuda, Yokkaichi (JP); Masayuki Kato, Yokkaichi (JP); Takeo Uchino, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 175 days.

(21) Appl. No.: 18/697,884

(22) PCT Filed: Sep. 15, 2022

(86) PCT No.: PCT/JP2022/034562
§ 371 (c)(1),
(2) Date: Apr. 2, 2024

(87) PCT Pub. No.: WO2023/058427
PCT Pub. Date: Apr. 13, 2023

(65) Prior Publication Data
US 2025/0007275 A1 Jan. 2, 2025

(30) Foreign Application Priority Data

Oct. 4, 2021 (JP) ................................. 2021-163568

(51) Int. Cl.
H02H 5/00 (2006.01)
H02H 1/00 (2006.01)
H02H 5/04 (2006.01)

(52) U.S. Cl.
CPC .......... H02H 5/047 (2013.01); H02H 1/0007 (2013.01); H02H 1/0092 (2013.01)

(58) Field of Classification Search
IPC ...................................................... H02H 5/047
See application file for complete search history.

(56) References Cited

U.S. PATENT DOCUMENTS 4,612,529 A 9/1986 Gurevich et al.
10,868,418 B2 * 12/2020 Djelassi-Tscheck ... H02H 3/085
(Continued)

FOREIGN PATENT DOCUMENTS

JP S62-089750 U 6/1987

OTHER PUBLICATIONS

International Search Report, Application No. PCT/JP2022/034562, mailed Nov. 1, 2022. ISA/Japan Patent Office.

*Primary Examiner* — Stephen W Jackson
(74) *Attorney, Agent, or Firm* — Brooks Kushman P.C.

(57) ABSTRACT

A power supply control apparatus controls the supplying of power through a wire. A fuse and a semiconductor switch are disposed on a current path of a wire current that flows through the wire. The fuse and the semiconductor switch are attached to a circuit board. A plurality of terminals of the fuse are connected by solder to the circuit board. A fusing portion is connected between two terminals out of the plurality of terminals. The two terminals are disposed on the current path of the wire current. The fusing portion blows according to the temperature of the fusing portion. A microcomputer issues an instruction to switch off the semiconductor switch according to the wire temperature of the wire.

8 Claims, 12 Drawing Sheets

(56) References Cited

U.S. PATENT DOCUMENTS

| 2011/0061930 | A1 | 3/2011 | Kazi et al. | |
| 2012/0081825 | A1 | 4/2012 | Nakamura et al. | |
| 2021/0050718 | A1* | 2/2021 | Djelassi-Tscheck | H02H 9/02 |
| 2022/0045502 | A1* | 2/2022 | Sawano | H02H 5/04 |
| 2023/0420207 | A1* | 12/2023 | Quenzer | H02J 7/00304 |

* cited by examiner

FIG. 12

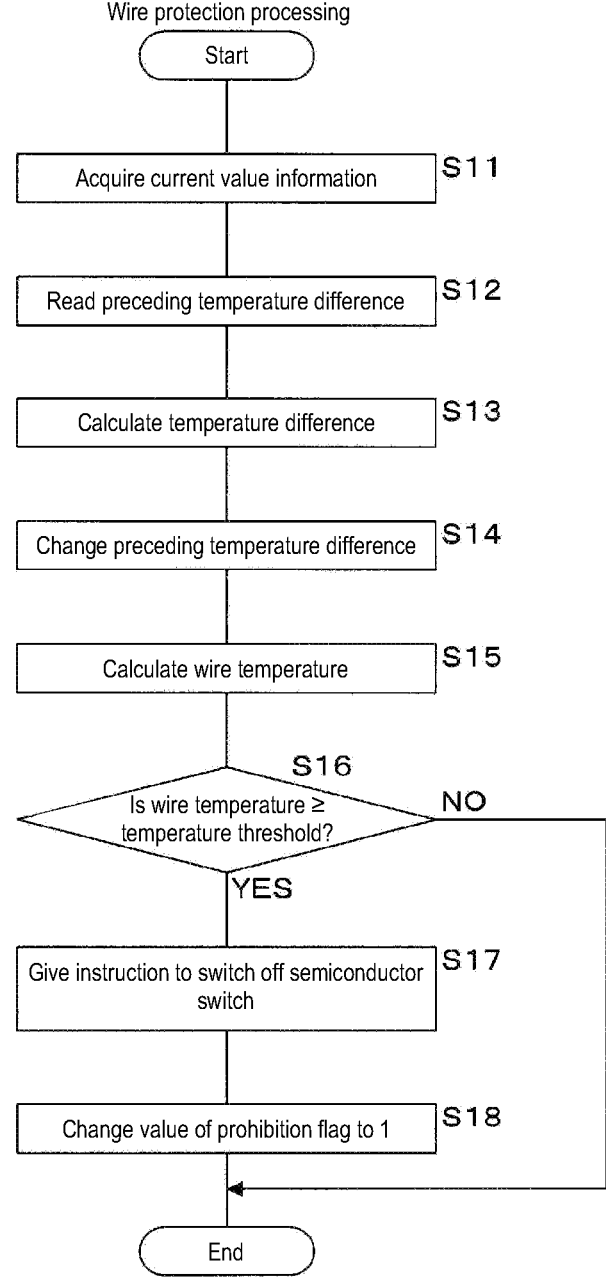

Wire protection processing

Start

Acquire current value information — S11

Read preceding temperature difference — S12

Calculate temperature difference — S13

Change preceding temperature difference — S14

Calculate wire temperature — S15

S16
Is wire temperature ≥ temperature threshold? — NO

YES

Give instruction to switch off semiconductor switch — S17

Change value of prohibition flag to 1 — S18

End

FIG. 13
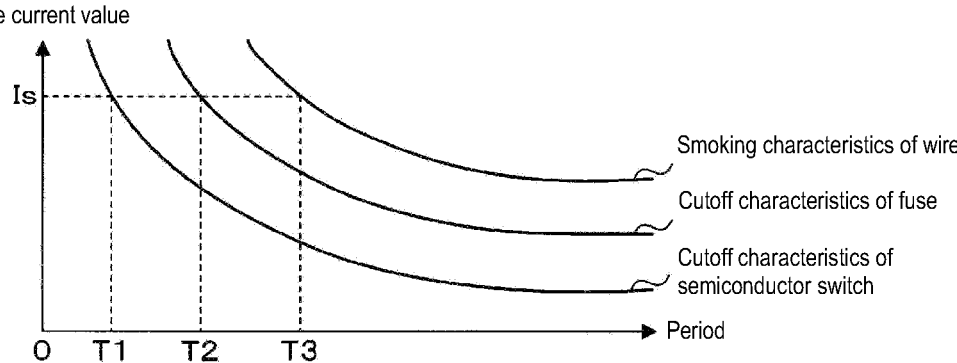
Wire current value
Is
Smoking characteristics of wire
Cutoff characteristics of fuse
Cutoff characteristics of
semiconductor switch
Period
O    T1      T2      T3
(explanation of graph)
Periods for which a current with a wire current value of is has continuously flowed
T1:  semiconductor switch switched off
T2:  fusing element blows
T3:  wire emits smoke
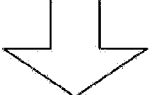

POWER SUPPLY CONTROL APPARATUS

CROSS-REFERENCE TO RELATED APPLICATIONS

This application is the U.S. national stage of PCT/JP2022/034562 filed on Sep. 15, 2022, which claims priority of Japanese Patent Application No. JP 2021-163568 filed on Oct. 4, 2021, the contents of which are incorporated herein.

TECHNICAL FIELD

The present disclosure relates to a power supply control apparatus.

BACKGROUND

JP 2010-283977A discloses a vehicle-mounted apparatus that prevents the temperature of an electric wire from rising to a high temperature. A current flows through the wire from the positive electrode of a DC power supply. In the apparatus described in JP 2010-283977A, a semiconductor switch is disposed on a current path of the current that flows through the wire. This semiconductor switch is switched on or off by a control circuit. When the semiconductor switch is on, the current flows through the wire. When the current flows through the wire, the wire will generate heat. When the amount of heat generated by the wire per unit time is larger than the amount of heat emitted by the wire per unit time, the temperature of the wire will rise.

In a state where the semiconductor switch is on, the control circuit calculates the temperature of the wire based on the current value of the current flowing through the wire. The control circuit switches off the semiconductor switch when the calculated temperature exceeds a predetermined temperature. Due to this, the flow of current through the wire stops and the temperature of the wire falls.

In JP 2010-283977A, when an on failure, where the semiconductor switch is fixed in the on state, occurs and the calculated temperature of the wire exceeds a predetermined temperature, the control circuit will be unable to switch off the semiconductor switch. If the temperature of the wire has risen to a temperature that significantly exceeds the predetermined temperature, there is the risk of the wire deteriorating. One example of deterioration in the wire is an increase in the resistance value of the wire. When the resistance value of the wire has increased, power consumption at the wire will increase. When this happens, power cannot be efficiently supplied through the wire.

The present disclosure was conceived in view of the situation described above, and has an object of providing a power supply control apparatus capable of preventing the temperature of the wire from rising to a high temperature, even when a failure has occurred at a semiconductor switch.

SUMMARY

A power supply control apparatus according to one aspect of the present disclosure is a power supply control apparatus that controls supplying of power through a wire, the power supply control apparatus including: a fuse and a semiconductor switch disposed on a current path of a wire current that flows through the wire; a circuit board to which the fuse and the semiconductor switch are attached; and a processing unit for executing processing, wherein the fuse includes: a plurality of terminals that are connected to the circuit board by solder; and a fusing portion connected between two terminals out of the plurality of terminals, the two terminals out of the plurality of terminals are disposed on the current path, the fusing portion blows according to a temperature of the fusing portion, and the processing unit issues an instruction to switch off the semiconductor switch according to a wire temperature of the wire.

Advantageous Effects

According to the aspect described above, it is possible to prevent the temperature of a wire from rising to a high temperature, even when a failure has occurred at a semiconductor switch.

BRIEF DESCRIPTION OF DRAWINGS

FIG. 12 is a flowchart depicting a procedure of a wire protection process.

FIG. 13 is a graph for describing the timing of fusing, cutting off, and smoking.

DETAILED DESCRIPTION OF PREFERRED EMBODIMENTS

Figure 1:
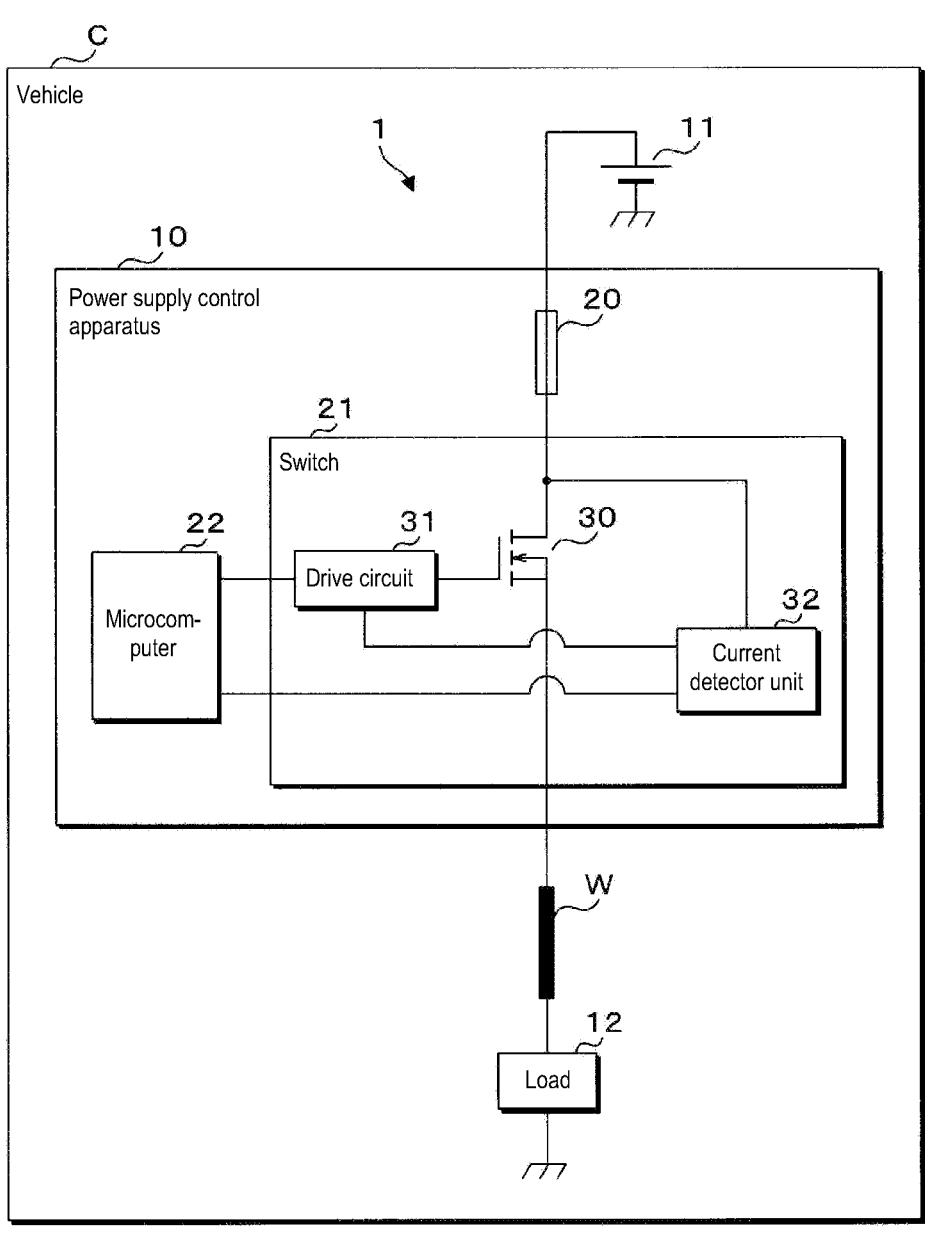
FIG. 1 is a block diagram depicting the configuration of a principal part of a power supply system according to a first embodiment.

Embodiments of the present disclosure will first be listed and described in outline. At least some parts of the embodiments described below may be freely combined.

A power supply control apparatus according to an aspect of the present disclosure is a power supply control apparatus that controls supplying of power through a wire, the power supply control apparatus including: a fuse and a semiconductor switch disposed on a current path of a wire current that flows through the wire; a circuit board to which the fuse and the semiconductor switch are attached; and a processing unit for executing processing, wherein the fuse includes: a plurality of terminals that are connected to the circuit board by solder; and a fusing portion connected between two terminals out of the plurality of terminals, the two terminals out of the plurality of terminals are disposed on the current path, the fusing portion blows according to a temperature of the fusing portion, and the processing unit issues an instruction to switch off the semiconductor switch according to a wire temperature of the wire.

According to the aspect described above, when the semiconductor switch is on, the wire current flows through the fuse, the semiconductor switch, and the wire. Due to this, the fusing portion of the fuse and the wire will generate heat. When the wire temperature has risen, the temperature of the fusing portion of the fuse will also rise. When the wire temperature is high, the semiconductor switch is switched off. By doing so, the flow of the wire current is stopped and the wire temperature falls.

When the wire temperature becomes high in a state where an on failure, where the semiconductor switch is fixed in the on state, has occurred, the fusing portion of the fuse blows. When this happens, the wire current will stop flowing and the wire temperature falls. Accordingly, it is possible to prevent the wire temperature from rising to a high temperature, even when an on failure where the semiconductor switch is fixed in the on state has occurred.

In the power supply control apparatus according to an aspect of the present disclosure, the processing unit issues the instruction to switch off the semiconductor switch when the wire temperature has become a temperature threshold or higher, and when the semiconductor switch is on, the wire temperature reaches the temperature threshold or higher before the fusing portion blows.

According to the aspect described above, so long as an on failure where the semiconductor switch is fixed in the on state has not occurred, the semiconductor switch will switch off before the fusing portion blows.

In the power supply control apparatus according to an aspect of the present disclosure, the fuse includes a housing that covers part of the plurality of terminals and the fusing portion, and the housing is resistant to a temperature of 300 degrees Celsius or higher.

According to the aspect described above, when the plurality of terminals of the fuse are connected to the circuit board by solder using reflowing, hot air will be blown onto the housing or the housing will be irradiated with infra-red rays. As a result, the temperature of the housing will rise. When the temperature of the housing is X degrees or lower, there will be no deformation or melting of the housing. Here, X is a positive real number. When there is no deformation or melting of the housing, the housing will maintain its shape. Resistance to a temperature of 300 degrees or higher means that X is 300 or higher. For this reason, there will be no melting or deformation of the housing due to exposure to hot air or irradiation with infra-red rays. This means that the fuse is suited to attachment to the circuit board by reflowing.

In the power supply control apparatus according to an aspect of the present disclosure, the circuit board includes: an insulating board; a plurality of through holes that pass through the insulating board; and a plurality of pieces of board plating that cover the insulating board, wherein the plurality of terminals of the fuse are inserted into a plurality of through holes, and are connected by the solder to the plurality of pieces of board plating on the circuit board.

According to the aspect described above, the plurality of terminals of the fuse are inserted into a plurality of through holes. In this state, each of the plurality of terminals is connected to the pieces of board plating on the circuit board by solder.

In the power supply control apparatus according to an aspect of the present disclosure, the plurality of terminals each include: a metal body; and terminal plating that is made of tin and covers a surface of the metal body.

According to the aspect described above, at each terminal, the surface of the metal body is covered with the terminal plating that is made of tin. Solder normally contains a tin component. Accordingly, the terminals that include the terminal plating made of tin have affinity with, that is, high wettability for, the solder. This means that solder will strongly adhere to the terminal.

The power supply control apparatus according to an aspect of the present disclosure further includes a switching circuit for switching the semiconductor switch on or off, wherein the switching circuit switches the semiconductor switch off when a voltage across both ends of the fusing portion of the fuse has reached a predetermined temperature or higher.

According to the aspect described above, the larger the current value of the wire current, the higher the voltage across both ends of the fusing portion. The switching unit switches off the semiconductor switch when the voltage across both ends of the fusing portion is equal to or above a predetermined voltage value, that is, when the current value of the wire current is large. Accordingly, an excessive current is prevented from flowing through the wire.

In the power supply control apparatus according to an aspect of the present disclosure, the processing unit repeatedly calculates the wire temperature based on a voltage value across both ends of the fusing portion of the fuse.

According to the aspect described above, the processing unit repeatedly calculates the wire temperature based on the voltage across both ends of the fusing portion. When the calculated wire temperature is equal to or higher than a temperature threshold, the semiconductor switch is switched off.

In the power supply control apparatus according to an aspect of the present disclosure, the fuse includes a housing that covers a part of the plurality of terminals and the fusing portion, and each of the plurality of terminals includes a first plate part in a shape of a long plate that is partially covered by the housing and a second plate part connected to the first plate part, and wherein for each of the plurality of terminals, one end of the first plate part protrudes from a same one face of the housing, the second plate part protrudes from a part of a front end face of the first plate part that protrudes from the housing, the circuit board includes a plurality of through holes, the second plate parts of the plurality of terminals are inserted into the plurality of through holes, and the first plate parts of the plurality of terminals contact the circuit board.

According to the aspect described above, the second plate parts protrude from the front end face of the first plate parts that protrude from the housing, producing stepped structures. Through holes are provided in the insulating board of the circuit board. On the insulating board, the inner faces of the through holes and the peripheral portions of the through holes are covered by the board plating. As one example, through holes whose area is slightly larger than the cross-sectional area of the second plate parts are provided. With this configuration, when the second plate parts have been inserted into the through holes, the first plate parts will contact the board plating that covers the peripheral portions of the through holes without passing through the through holes. Here, the housing is separated from the circuit board by the first plate parts. With this configuration, when the terminals are attached to the circuit board with solder, the solder is likely to be formed in a fillet shape. The formation of the solder in a fillet shape means that favorable attachment is achieved.

Specific examples of a power supply system according to the present disclosure will now be described with reference to the drawings. Note that the present disclosure is not limited to the embodiments described here, is instead indicated by the range of the patent claims, and is intended to include all modifications within the meaning and scope of the range of the patent claims and their equivalents.

First Embodiment

Configuration of Power Supply System

FIG. 1 is a block diagram depicting the configuration of a principal part of a power supply system 1 according to a first embodiment. The power supply system 1 is mounted in a vehicle C. The power supply system 1 includes a power supply control apparatus 10, a DC power supply 11, and a load 12. The power supply control apparatus 10 includes a fuse 20, a switching device 21, and a microcomputer 22. As one example, the switching device 21 is an IPD (Intelligent Power Device). The switching device 21 includes a semiconductor switch 30 and a drive circuit 31. The semiconductor switch 30 is an N-channel FET (Field Effect Transistor). As one example, the DC power supply 11 is a battery. The load 12 is an electrical device.

The negative electrode of the DC power supply 11 is grounded. This grounding is achieved by connecting the electrode to the body of the vehicle C, for example. The positive electrode of the DC power supply 11 is connected to one end of the fuse 20. The other end of the fuse 20 is connected to the drain of the semiconductor switch 30. The source of the semiconductor switch 30 is connected to one end of a wire W. The other end of the wire W is connected to one end of the load 12. The other end of the load 12 is grounded. The gate of the semiconductor switch 30 is connected to the drive circuit 31. The drive circuit 31 is also connected to the microcomputer 22.

The microcomputer 22 outputs a high level voltage or a low level voltage to the drive circuit 31. When the microcomputer 22 has switched the output voltage from the low level voltage to the high level voltage, the drive circuit 31 switches the semiconductor switch 30 from off to on. When the microcomputer 22 has switched the output voltage from the high level voltage to the low level voltage, the drive circuit 31 switches the semiconductor switch 30 from on to off. The drive circuit 31 functions as a switching circuit.

When the semiconductor switch 30 is on, the resistance between the drain and the source of the semiconductor switch 30 is sufficiently low. This enables a current to flow through the drain and the source. When the semiconductor switch 30 is off, the resistance between the drain and the source of the semiconductor switch 30 is sufficiently large. This means that a current will not flow through the drain and the source.

When the drive circuit 31 has switched on the semiconductor switch 30, a current flows from the positive electrode of the DC power supply 11 to the fuse 20, the semiconductor switch 30, the wire W, and the load 12 in that order. In the following description, the current that flows through the wire W is referred to as the "wire current". The current value of the wire current is referred to as the "wire current value". The fuse 20 and the semiconductor switch 30 are disposed on the current path of the wire current. When the wire current flows, power is supplied to the load 12. When power is supplied to the load 12, the load 12 operates. When the drive circuit 31 switches off the semiconductor switch 30, the wire current stops flowing. As a result, the supplying of power to the load 12 stops and the load 12 stops operating. In the power supply control apparatus 10, the drive circuit 31 switches the semiconductor switch 30 on or off to control the supplying of power to the load 12 through the wire W.

When a current flows through the fuse 20, the fuse 20 will generate heat. At the fuse 20, if the amount of heat generated per unit time exceeds the amount of heat emitted per unit time, the fuse temperature of the fuse 20 will rise. If the amount of heat generated per unit time is less than the amount of heat emitted per unit time, the fuse temperature will fall. In the same way, when the wire current flows, the wire W generates heat. At the wire W, if the amount of heat generated per unit time exceeds the amount of heat emitted per unit time, the wire temperature of the wire W rises. When the amount of heat generated per unit time is less than the amount of heat emitted per unit time, the wire temperature falls.

As will be described later, the microcomputer 22 repeatedly calculates the wire temperature based on the wire current value. The microcomputer 22 switches the output voltage from the high-level voltage to the low-level voltage when the calculated wire temperature becomes a temperature that is equal to or higher than a certain temperature threshold. By doing so, the drive circuit 31 switches the semiconductor switch 30 from on to off.

When the wire current flows, the current flows through the fuse 20. Accordingly, when the wire temperature rises, the fuse temperature will also rise. When the fuse temperature reaches a certain blowing temperature or higher, the fuse 20 will blow. When the fuse 20 has blown, the flow of current through the fuse 20 stops. As a result, the wire current stops flowing. The wire temperature at which the fuse temperature reaches the blowing temperature is referred to as the "reference temperature". This reference temperature exceeds the temperature threshold.

As one example, if both ends of the load 12 are short-circuited in a state where the semiconductor switch 30 is on, the wire current will rapidly increase and the wire temperature and the fuse temperature will rise. When an "on failure" where the semiconductor switch 30 becomes fixed in the on state has not occurred, the drive circuit 31 will switch the semiconductor switch 30 off when the wire temperature has reached a temperature that is equal to or higher than the temperature threshold. As a result, the wire current stops flowing and the wire temperature falls.

When an on failure has occurred, the fuse 20 will melt when the wire temperature has reached or exceeded the reference temperature. As a result, the wire current will stop flowing and the wire temperature will fall. Accordingly, even if an on failure has occurred at the semiconductor switch 30, it is possible to prevent the wire temperature from rising to a temperature that is higher than the reference temperature.

Layout of Fuse 20, Switching device 21, and Microcomputer 22

Figure 2:
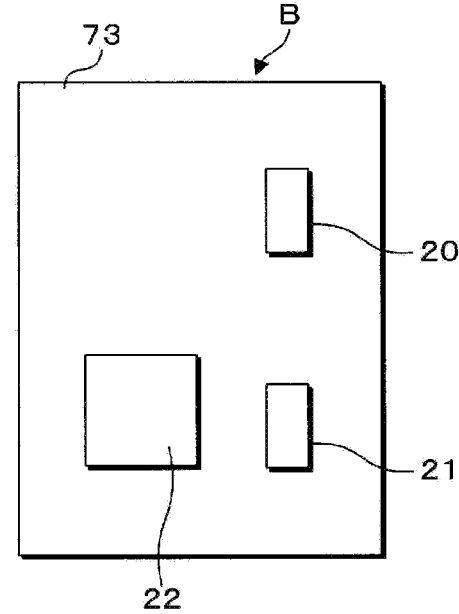
FIG. 2 is a diagram for describing a layout of a fuse, a switch, and a microcomputer.

FIG. 2 is a diagram for describing the layout of the fuse 20, the switching device 21, and the microcomputer 22. The power supply control apparatus 10 further includes a rectangular circuit board B. FIG. 2 shows the face of the circuit board B from above. The switching device 21 and the microcomputer 22 are integrated circuit elements. The fuse 20, the switching device 21, and the microcomputer 22 are attached to the board face of the circuit board B. The "board face" is a wide face of the board, and differs from the end faces. Attachment of the switching device 21 corresponds to attachment of the semiconductor switch 30.

Note that when the switching device 21 is not an integrated circuit element, the semiconductor switch 30 and one or a plurality of components that construct the drive circuit 31 are attached to the board face of the circuit board B. The microcomputer 22 may also be disposed on a board face of a different circuit board from the circuit board B.

Structure of Fuse 20

Figure 3:
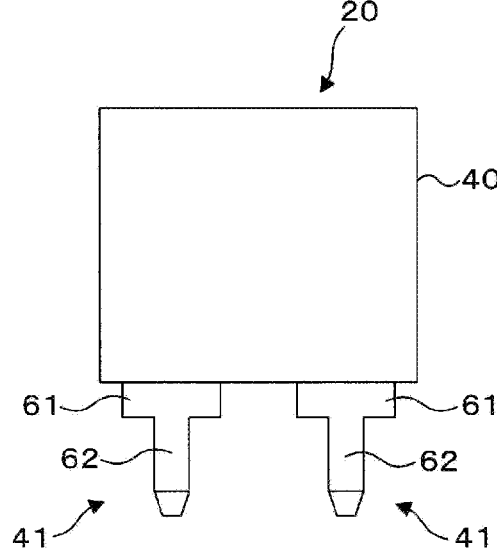
FIG. 3 is a front view of the fuse.
Figure 4:
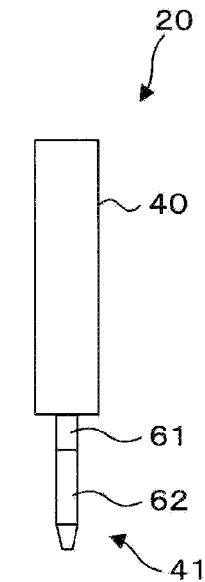
FIG. 4 is a side view of the fuse.

FIG. 3 is a front view of the fuse 20. FIG. 4 is a side view of the fuse 20. The fuse 20 includes a housing 40, which is made of resin, and two terminals 41. The respective terminals 41 are electrically conductive. On the fuse 20, the two terminals 41 protrude from a same one face of the housing 40.

Figure 5:
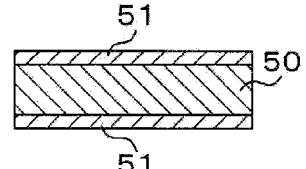
FIG. 5 is a cross-sectional view of a terminal.

FIG. 5 is a cross-sectional view of a terminal 41. Each terminal 41 includes a metal body 50 in the form of a long plate. On each terminal 41, two plate faces of the metal body 50 are covered with terminal plating 51 made of tin (Sn). The metal body 50 is exposed at the end faces of each terminal 41. The metal body 50 and the terminal plating 51 are electrically conductive. The metal body 50 is manufactured using a zinc alloy, for example. The metal body 50 and the terminal plating 51 have been omitted from drawings aside from FIG. 5.

Note that the terminal plating 51 may also cover a face of the metal body 50 aside from the plate faces, as one example, an end face located on the left or right in FIG. 5.

Figure 6:
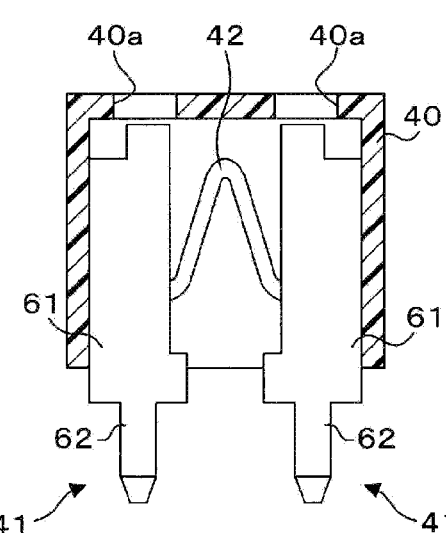
FIG. 6 is a cross-sectional view of the fuse.

FIG. 6 is a cross-sectional view of the fuse 20. As depicted in FIGS. 3, 4 and 6, the housing 40 is in a box shape where the one face is open. Each of the two terminals 41 is partially covered by the housing 40. As described earlier, the two terminals 41 protrude from the same one face of the housing 40. In this example, this same one face is the open side. On the housing 40, this same one face is located at the bottom in FIGS. 3, 4, and 6. As depicted in FIG. 6, inside the housing 40, the two terminals 41 are arranged in a line. The fuse 20 further includes a fusing portion 42 in the shape of a bar. The fusing portion 42 is connected between the two terminals 41. The fusing portion 42 is electrically conductive. The fusing portion 42 is also covered by the housing 40.

Figure 7:
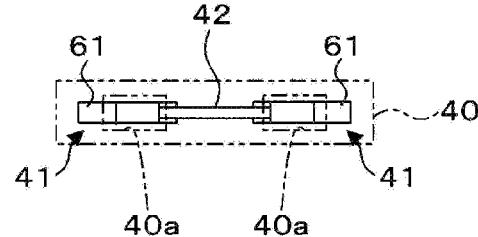
FIG. 7 is a diagram for describing a state of a terminal and a fusing portion viewed from above in FIG. 3.

FIG. 7 is a diagram for describing the state of the two terminals 41 and the fusing portion 42 when looking from above in FIG. 3. As depicted in FIGS. 6 and 7, each terminal 41 is shaped as a long plate. The plate faces of the two terminals 41 are aligned, with the plate faces of the two terminals 41 being depicted in FIG. 6. One end of each terminal 41 protrudes downward in FIG. 6 from the same one face (open face) of the housing 40. Note that it is preferable for the plate faces of the two terminals 41 to be positioned on the same plane.

Since each terminal 41 is shaped as a long plate, the fuse 20 is a blade fuse. The cross-sectional area of the terminals of a blade fuse is typically larger than the cross-sectional area of the terminals of a chip-type fuse. This means that a blade fuse can be used as a fuse for a circuit in which a large current flows during a normal state.

On each terminal 41, an end of a first plate part 61, which is in the shape of a long plate, is connected to an end of a second plate part 62, which is also in the shape of a long plate. Part of the first plate part 61 is covered by the housing 40. For each of the two terminals 41, a first end of the first plate part 61 protrudes downward in FIG. 6 from the same one face of the housing 40 described earlier. The same one face of the housing 40 and front end faces at the first ends of the first plate parts 61 are parallel. Also, for the two terminals 41, the front end faces at the first ends of the two first plate parts 61 are positioned on the same plane.

Note that expression "parallel" for the same one face and the front end faces does not refer to a state of complete parallel and may be a state that is substantially parallel. Accordingly, a state in which the same one face and the front end faces are parallel includes the state where the angle formed by the same one face and the front end faces is within a design error range. The two front end faces being located on the same plane also means that there is substantially no level difference between the two front end faces. Accordingly, when the level difference between the two front end faces is within a design error range, the two front end faces are regarded as being positioned on the same plane.

On each terminal 41, the second plate part 62 protrudes along the length direction of the first plate part 61 from part of the front end face at the first end of the first plate part 61. The cross-sectional area of the second plate part 62 is smaller than the cross-sectional area of the first plate part 61. The second plate part 62 is also narrower than the first plate part 61. The thicknesses of the first plate part 61 and the second plate part 62 are the same. The plate faces of the first plate part 61 and the second plate part 62 are continuous. The length directions of the first plate part 61 and the second plate part 62 are the same, which is the vertical direction in FIGS. 3, 4, and 6. The cross-sectional areas of the first plate part 61 and the second plate part 62 are the areas of the cross sections obtained by cutting along the width direction of the first plate part 61 and the second plate part 62, that is, along the left-right direction in FIGS. 3, 4, and 6.

Note that the thicknesses of the first plate part 61 and the second plate part 62 being the same does not refer to only a perfect match, and the thicknesses may be substantially the same. Accordingly, a state in which the thicknesses of the first plate part 61 and the second plate part 62 are the same also includes the state in which the difference between the two thicknesses is within a range of error. The length directions of the two plate parts matching does not only mean a perfect match, and may be a substantial match. Accordingly, a state in which the two length directions match also includes a state in which the angle formed by the two length directions is within a range of error.

On each of the two terminals 41, the second plate part 62 protrudes from a center part in the direction in which the two terminals 41 are aligned, of the front end face at the first end of the first plate part 61. This direction of alignment is the left-right direction in FIG. 6. As depicted in FIGS. 3 and 4, a front end part of the second plate part 62 is shaped like a truncated pyramid. The front end part of the second plate part 62 has a large cross-sectional area near the housing 40 and a small cross-sectional area far from the housing 40.

As depicted in FIGS. 6 and 7, the bar-shaped fusing portion 42 is disposed between the first plate parts 61 of the two terminals 41. One end of the fusing portion 42 is connected to an end face of the first plate part 61 of one terminal 41. The other end of the fusing portion 42 is connected to an end face of the first plate part 61 of the other terminal 41. The two end faces to which the fusing portion 42 is connected face each other. The fusing portion 42 is bent so as to be formed in an overall V shape. In the example in FIG. 6, the fusing portion 42 is bent upward in FIG. 6. Note that the shape of the fusing portion 42 is not limited to a V shape, and may be an S shape for example.

As depicted in FIGS. 6 and 7, two openings 40a are provided in a face of the housing 40 that is positioned opposite the same one face described earlier, that is, in the upper face in FIG. 6. Second ends of the first plate parts 61 of the two terminals 41 face these two openings 40*a*. As one example, the user of the fuse 20 can insert two lead rods of a tester through these two openings 40*a*. In this state, the user can place the two lead rods of the tester in contact with the two terminals 41 of the fuse 20. The tester measures the resistance for example between the two terminals 41. The user can confirm whether the fusing portion 42 has blown based on the measured resistance value.

Attachment of Fuse 20

Figure 8:
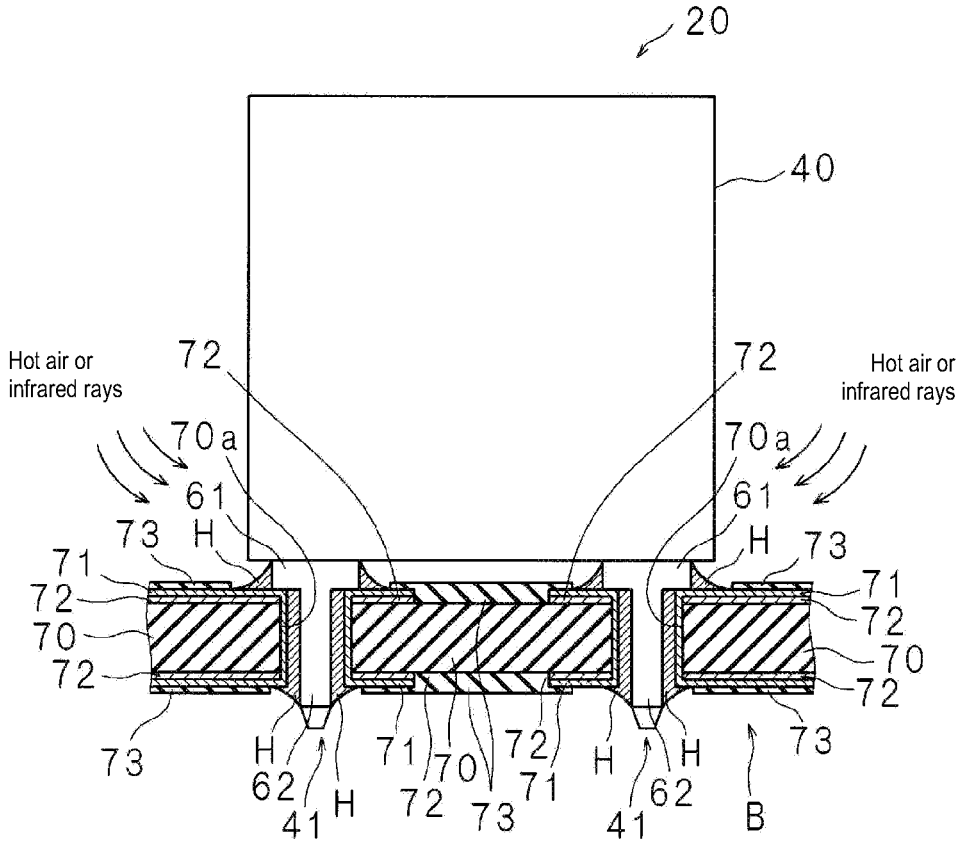
FIG. 8 is a diagram for describing a state where a fuse has been attached to a circuit board.
Figure 9:
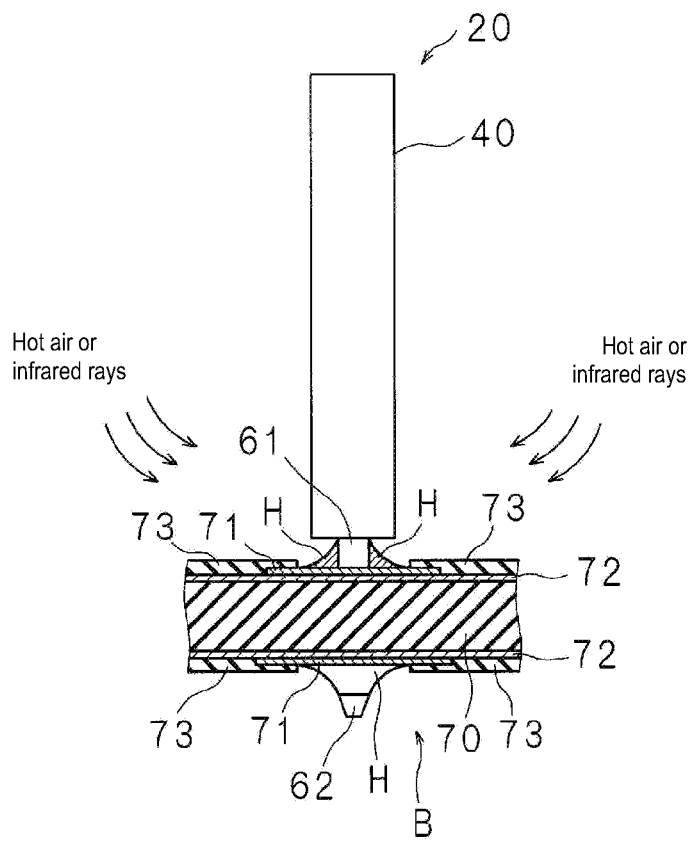
FIG. 9 is another diagram for describing a state where a fuse has been attached to a circuit board.

FIG. 8 is a diagram for describing a state where the fuse 20 is attached to the circuit board B. FIG. 9 is another diagram for describing the state where the fuse 20 is attached to the circuit board B. The circuit board B is a so-called printed circuit board. The fuse 20 is attached to the circuit board B by solder H. FIGS. 8 and 9 depict a state after the fuse 20 has been attached to the circuit board B by the solder H. FIGS. 8 and 9 depict cross sections of the circuit board B. As shown in FIGS. 8 and 9, the circuit board B includes an insulating board 70. The insulating board 70 is provided with two through holes 70*a* that pass through from a front plate surface to a rear plate surface. The number of through-holes 70*a* is equal to or greater than the number of terminals 41 of the fuse 20. The openings of the through holes 70*a* are circular. In FIGS. 8 and 9, the upper plate surface of the insulating board 70 is the front plate surface, and the lower plate surface is the rear plate surface.

A plurality of conductive wiring patterns 72 are disposed on the front plate surface of the insulating board 70. A plurality of wiring patterns 72 are also disposed on the rear surface of the insulating board 70. On the circuit board B, the inner face of each through hole 70*a* is covered by board plating 71. This board plating 71 is electrically conductive. The wiring patterns 72 cover peripheral portions of the through holes 70*a* on each of the front plate surface and the rear plate surface. The board plating 71 covers the inner faces of the through-holes 70*a* and also the peripheral portions of the through-holes 70*a* on each of the front and rear plate surfaces through the wiring patterns 72. In FIG. 8, the board plating 71 covers the peripheral portions of the through holes 70*a* from above the wiring patterns 72 and also covers the peripheral portions of the through holes 70*a* from below the wiring pattern 72.

The board plating 71 contains a tin component, for example. The wiring patterns 72 are made of copper, for example. The board plating 71 is in contact with the wiring patterns 72 and is electrically connected to the wiring patterns 72 and is electrically connected to the wiring patterns 72. The board plating 71 is covered with an insulating resist 73, except for the inner faces and peripheral portions of the through-holes 70*a*.

The area of each through hole 70*a* is slightly larger than the cross-sectional area of the second plate parts 62 of the terminals 41. This means that the second plate parts 62 of the terminals 41 can be inserted into the through holes 70*a*. Since the widths of the first plate parts 61 are sufficiently large, when the second plate parts 62 are inserted into the through holes 70*a*, the first plate parts 61 of the terminals 41 will come into contact with the board plating 71 that covers the peripheral portions of the through holes 70*a* without passing through the through holes 70*a*. Since the front end faces of the first ends of the two first plate parts 61 are located on the same plane, the fuse 20 is supported by the circuit board B in a stable state.

When attaching the fuse 20 to the circuit board B, paste-like solder H is applied onto the board plating 71 that covers the front plate surface of the insulating board 70. In a state where the solder H has been applied onto the board plating 71, the second plate parts 62 of the two terminals 41 are inserted into the two through-holes 70*a* from the front side of the insulating board 70, that is, from above in FIGS. 8 and 9. When doing so, the first plate parts 61 of the two terminals 41 are supported by the board plating 71 that covers the front plate surface. Parts of the second plate parts 62 are exposed from the rear plate surface of the circuit board B.

In this state, the fuse 20 and the circuit board B are passed through a reflow furnace. Inside the reflow furnace, the fuse 20 and the circuit board B are either blown with hot air or the fuse 20 and the circuit board B are irradiated with infrared rays. This results in the paste-like solder H melting. The solder H connects the terminals 41 to the board plating 71 of the circuit board B. In more detail, as depicted in FIGS. 8 and 9, some of the solder H adheres to the plate surfaces and end faces of the first plate parts 61 of the terminals 41 exposed from the housing 40 around the axes of the first plate parts 61 and also adheres to the board plating 71 covering the front plate surface of the insulating board 70.

In addition, some of the melted solder H flows inside the through holes 70*a* and adheres to the board plating 71 covering the inner faces of the through holes 70*a* and the plate surfaces and end faces of the second plate parts 62 of the terminals 41. The solder H is electrically conductive. The solder H electrically connects the terminals 41 and the board plating 71. The two terminals 41 of the fuse 20 are connected by the solder H to the board plating 71 at two locations on the circuit board B.

As described above, in the power supply control apparatus 10, the fuse 20 is attached to the circuit board B. The two terminals 41 are inserted into the two through holes 70*a*. In this state, the two terminals 41 are connected to the board plating 71 at two locations by the solder H.

On the fuse 20, one terminal 41 corresponds to one end that is connected to the positive electrode of the DC power supply 11. The other terminal 41 corresponds to one end connected to the drain of the semiconductor switch 30. As mentioned earlier, the wire current flows through the fuse 20. In the fuse 20, the wire current flows through the one terminal 41, the fusing portion 42, and the other terminal 41 in that order. The two terminals 41 and the fusing portion 42 are disposed on the current path of the wire current.

When current flows through the fusing portion 42, the fusing portion 42 generates heat. The heat generated at the fuse 20 is this heat generated by the fusing portion 42. The fuse temperature is the temperature of the fusing portion 42. At the fusing portion 42, if the amount of heat generated per unit time exceeds the amount of heat emitted per unit time, the fuse temperature will rise. If the amount of heat generated per unit time is less than the amount of heat emitted per unit time, the fuse temperature will fall. When the fuse temperature has reached the blowing temperature or higher, the fusing portion 42 blows. As a result, current stops flowing through the fuse 20.

Heat Resistance of Housing 40

As one example of a reflowing method, the circuit board B on which the fuse 20 is disposed passes through a first region and a second region in that order inside a reflow furnace. The temperature of the first region is in a range of 170 degrees to 190 degrees Celsius. The circuit board B is placed inside the first region for 80 seconds to 140 seconds. The temperature of the second region is in a range of 230 degrees to 250 degrees Celsius. The circuit board B is placed inside the second region for 60 to 90 seconds.

When the fuse 20 is attached to the circuit board B by reflowing, either hot air is blown onto the housing 40 or the housing 40 is irradiated with infrared rays. When doing so, the temperature of the housing 40 rises. When the temperature of the housing 40 is X degrees or lower, no deformation or melting occurs for the housing 40. Here, X is a positive real number. If no deformation or melting occurs for the housing 40, the housing 40 will maintain its shape. The housing 40 is resistant to a temperature of 250 degrees Celsius or higher. For the housing 40, the expression "resistant to a temperature of 250 degrees Celsius or higher" means that X is 250 or higher.

When the housing 40 is resistant to a temperature of 250 degrees Celsius or higher, the housing 40 will not deform or melt due to the blowing of hot air or irradiation with infrared rays, so that the housing 40 will maintain its shape. This means that the fuse 20 is suited to attachment to the circuit board B by reflowing. One example of a heat-resistant resin used for manufacturing the housing 40 is nylon resin.

Note that it is preferable for the housing 40 to resist a temperature of 300 degrees Celsius or higher. For the housing 40, the expression "resist a temperature of 300 degrees Celsius or higher" means that X is 300 or higher. When the housing 40 is resistant to a temperature of 300 degrees Celsius or higher, the fuse 20 is even more suited to attachment to the circuit board B by reflowing.

Heat Resistance of Fuse 20

When the temperature of the fuse 20 is Y degrees or lower, the fusing characteristics (see FIG. 13) of the fuse 20 will not substantially change and there will be no effective deterioration in long-term reliability. The fuse 20 is resistant to a temperature of 250 degrees Celsius or higher. For the fuse 20, the expression "resistant to a temperature of 250 degrees Celsius or higher" means that Y is 250 or higher. In addition to the housing 40, the fuse 20 is also resistant to a temperature of 250 degrees Celsius or higher. Accordingly, when the temperature of the fuse 20 is 250 degrees or lower, the fusing characteristics will not substantially change and there will be effectively no deterioration in long-term reliability. The fusing characteristics indicate the relationship between the current value of the current flowing through the fuse 20 and the fusing time taken from the current starting to flow until the fusing portion 42 blows. The fusing characteristics indicate fusing times corresponding to various current values. The long-term reliability is the lifespan during which the fuse 20 functions normally in keeping with its specification. It is not desirable for the lifespan of the fuse 20 to be reduced by attachment by reflowing.

Note that the fuse 20 is also preferably resistant to a temperature of 300 degrees Celsius or higher. For the fuse 20, "resistant to a temperature of 300 degrees Celsius or higher" means that Y is 300 or higher. When the fuse 20 is resistant to a temperature of 300 degrees Celsius or higher, this makes the configuration of the fuse 20 more suited to attachment to the circuit board B by reflowing.

Effect of Fuse 20

As described earlier, on each terminal 41, the surface of the metal body 50 is covered with the terminal plating 51 which is made of tin. The solder H normally contains a tin component. Accordingly, the terminals 41 that include the terminal plating 51 made of tin have affinity with, that is, high wettability for, the solder H. This means that the solder H will strongly adhere to the terminal 41.

Note that the terminal plating 51 is not limited to being made of tin, and may be made of an alloy containing a tin component, for example.

As described earlier, on each terminal 41, the second plate part 62 protrudes from the front end face of the first plate part 61, producing a stepped structure. For each of the two terminals 41, the first plate part 61 contacts the board plating

71 on the insulating board 70 without passing through the through hole 70a. This separates the housing 40 from the circuit board B. With this configuration, when each terminal 41 is attached to the circuit board B with the solder H, the solder H is likely to be formed into a fillet shape. The formation of the solder H in a fillet shape means that favorable attachment is achieved.

The terminals 41 are inserted into the through holes 70a in a state where the paste-like solder H has been applied onto the board plating 71. Since stepped structures are realized as described earlier, when the terminals 41 are inserted into the through holes 70a, the housing 40 will not come into contact with the paste-like solder H. This means that when the solder H is melted by reflowing, there is little risk of the solder H being formed into ball shapes.

As described earlier, for each terminal 41, the cross-sectional area of the second plate part 62 is smaller than the cross-sectional area of the first plate part 61, and the second plate part 62 is narrower than the first plate part 61. For this reason, through holes with a small area can be used as the through holes 70a. In this case, the gaps between the second plate parts 62 and the through holes 70a are small. This means that even if hot air is blown onto the housing 40 for example, the second plate parts 62, that is, the fuse 20, will not become greatly tilted and the housing 40 will be erected substantially perpendicularly to the plate surface of the circuit board B. As a result, when mounting is performed by reflowing, it is not necessary to fix the housing 40 in a substantially vertical state using a jig, which means that mounting can be performed at low cost.

Detailed Configuration of Power Supply Control Apparatus 10

For the semiconductor switch 30 depicted in FIG. 1, if the gate voltage relative to the source potential is equal to or greater than a certain voltage, the state is "on". If the gate voltage relative to the source potential is below the certain voltage, the state is "off". When the output voltage of the microcomputer 22 has switched from the low level voltage to the high level voltage, the drive circuit 31 raises the gate voltage relative to the ground potential. As a result, the gate voltage relative to the source potential rises to a voltage that is equal to or greater than the certain voltage, which switches on the semiconductor switch 30.

When the output voltage of the microcomputer 22 has switched from the high level voltage to the low level voltage, the drive circuit 31 lowers the gate voltage relative to the ground potential. By doing so, the gate voltage relative to the source potential drops to a voltage that is below the certain voltage, which switches off the semiconductor switch 30.

The switching device 21 further includes a current detector unit 32. The current detector unit 32 is connected to the drain of the semiconductor switch 30. The current detector unit 32 is also connected separately to the microcomputer 22 and the drive circuit 31.

The current detector unit 32 detects the wire current value. In more detail, the current detector unit 32 draws current from the drain of the semiconductor switch 30. The current value of the current drawn by the current detector unit 32 is expressed by (wire current value)/(a predetermined number).

The current detector unit 32 generates analog current value information indicating the wire current value based on this drawn current. As one example, the analog current value information is a voltage value that is proportional to the wire current value. The current detector unit 32 outputs analog current value information to the microcomputer 22 and the drive circuit 31.

When the wire current value is below a certain current threshold, the drive circuit 31 switches the semiconductor switch 30 on or off according to the output voltage of the microcomputer 22 as described earlier. When the wire current value has become equal to or higher than the current threshold value, the drive circuit 31 switches off the semiconductor switch 30 regardless of the output voltage of the microcomputer 22. Accordingly, the wire current value is prevented from exceeding the current threshold value. After switching off the semiconductor switch 30 regardless of the output voltage of the microcomputer 22, the drive circuit 31 keeps the semiconductor switch 30 off until a predetermined condition is satisfied. As one example, the predetermined condition is that the output voltage of the microcomputer 22 has switched from the low level voltage to the high level voltage.

Figure 10:
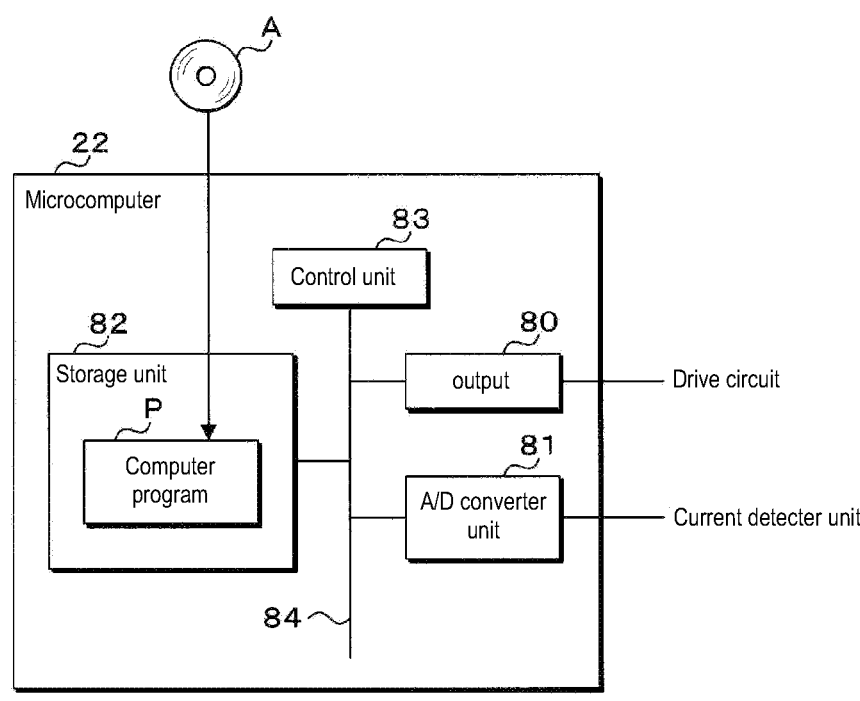
FIG. 10 is a block diagram depicting the configuration of a principal part of a microcomputer.

FIG. 10 is a block diagram depicting the configuration of a principal part of the microcomputer 22. The microcomputer 22 includes an output unit 80, an A/D converter unit 81, a storage unit 82, and a control unit 83. These elements are connected to an internal bus 84. The output unit 80 is also connected to the drive circuit 31. The A/D converter unit 81 is also connected to the current detector unit 32.

The output unit 80 outputs the high level voltage or the low level voltage to the drive circuit 31. The output voltage of the microcomputer 22 mentioned earlier is this output voltage of the output unit 80. The control unit 83 instructs the output unit 80 to turn on the semiconductor switch 30. When this happens, the output unit 80 switches the output voltage to the high level voltage. As a result, the drive circuit 31 switches on the semiconductor switch 30. The control unit 83 instructs the output unit 80 to switch off the semiconductor switch 30. When this happens, the output unit 80 switches the output voltage to the low level voltage. As a result, the drive circuit 31 switches off the semiconductor switch 30.

The analog current value information indicating the wire current value is inputted into the A/D converter unit 81. The A/D converter unit 81 converts the analog current value information into digital current value information. This digital current value information produced by conversion by the A/D converter unit 81 is acquired by the control unit 83. The wire current value indicated by the current value information acquired by the control unit 83 substantially matches the wire current value at the time of acquisition.

As one example, the storage unit 82 is composed of a volatile memory and a nonvolatile memory. The storage unit 82 stores a computer program P (or program product). The control unit 83 includes a processing element that executes processing and functions as a processing unit. By executing the computer program P, the processing element of the control unit 83 executes power supply control processing, wire protection processing, and the like. The power supply control processing is processing for controlling the supplying of power to the load 12 through the wire W. The wire protection processing is processing for protecting the wire W from smoking.

Note that the computer program P may be stored in a storage medium A so as to be readable by the processing element of the control unit 83. In this case, the computer program P read out from the storage medium A by a reader apparatus, not illustrated, is written in the storage unit 82. The storage medium A is an optical disc, a flexible disk, a magnetic disk, a magneto-optical disc, a semiconductor memory, or the like. Examples of optical discs include CD (Compact Disc)-ROM (Read Only Memory), DVD (Digital Versatile Disc)-ROM, and BD (Blu-ray (registered trademark) Discs). One example of a magnetic disk is a hard disk drive. Alternatively, the computer program P may be downloaded from an apparatus, not illustrated, connected to a communication network, not illustrated, and the downloaded computer program P may be written into the storage unit 82.

The number of processing elements provided in the control unit 83 is not limited to one and may be two or more. In this case, the plurality of processing elements may cooperatively execute the power supply control processing, the wire protection processing, and the like according to the computer program P.

The storage unit 82 stores the value of a prohibition flag. The value of the prohibition flag is 0 or 1 and is changed by the control unit 83. A prohibition flag of "O" indicates a state where on/off switching of the semiconductor switch 30 is permitted. The value of the prohibition flag is changed from 0 to 1 in a state where the semiconductor switch 30 is off. A prohibition flag of 1 indicates a state where switching on of the semiconductor switch 30 is prohibited.

Power Supply Control Processing

Figure 11:
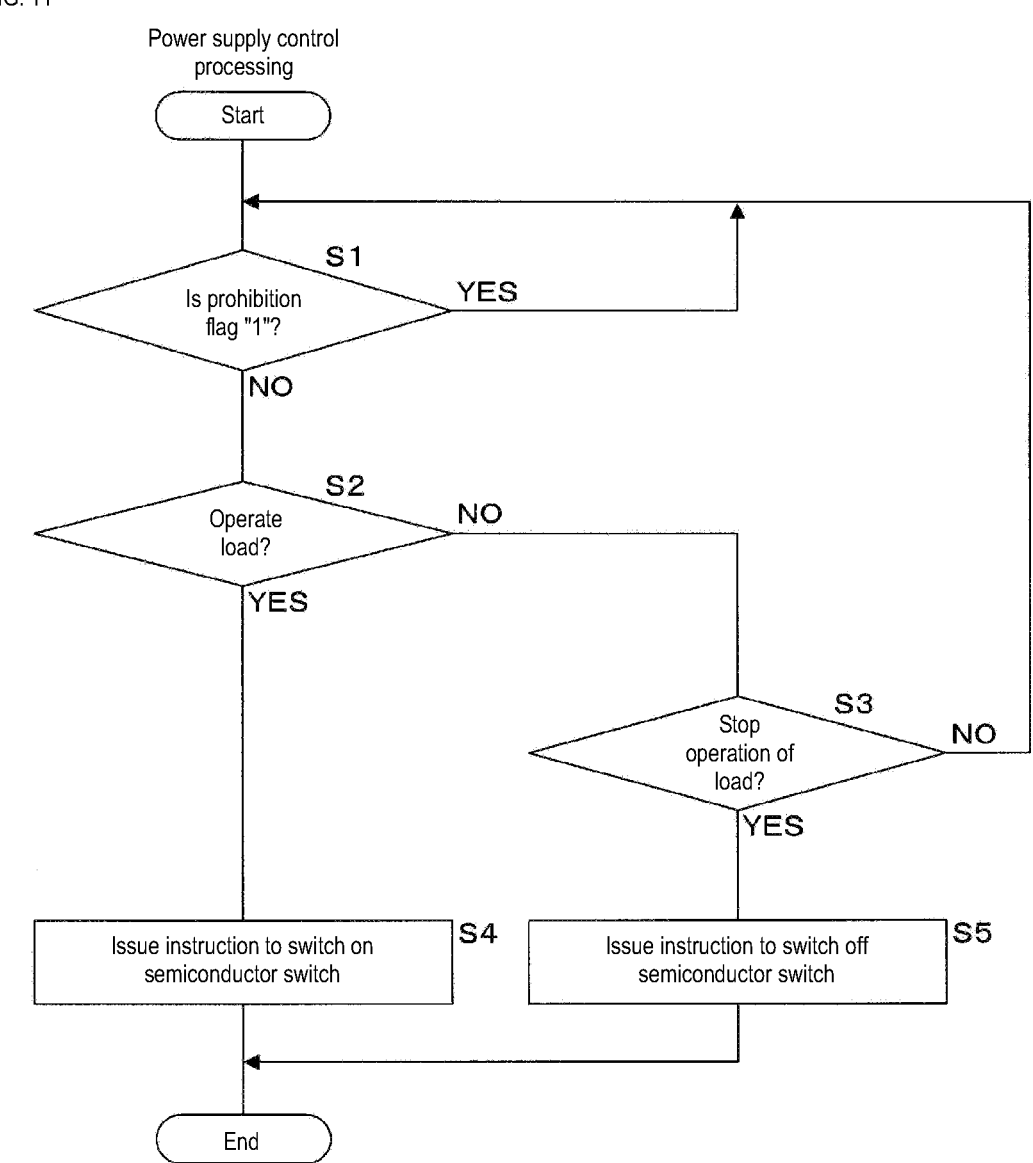
FIG. 11 is a flowchart depicting the procedure of a power supply control process.

FIG. 11 is a flow chart indicating the procedure of the power supply control processing. In the power supply control processing, the control unit 83 determines whether the value of the prohibition flag is 1 (step S1). If the value of the prohibition flag is not 1, this means that the value of the prohibition flag is 0. When the control unit 83 has determined that the value of the prohibition flag is 1 (S1: YES), the control unit 83 executes step S1 again and waits until the value of the prohibition flag becomes 0.

When the control unit 83 has determined that the value of the prohibition flag is not 1 (S1: NO), the control unit 83 determines whether the load 12 is to be operated (step S2). As one example, in step S2, when an operation signal indicating operation of the load 12 has been inputted into the input unit of the microcomputer 22, the control unit 83 determines that the load 12 is to be operated. If the operation signal has not been inputted into the input unit, the control unit 83 determines that the load 12 is not to be operated.

When the control unit 83 has determined not to operate the load 12 (S2: NO), the control unit 83 then determines whether the operation of the load 12 is to be stopped (step S3). As one example, when, in step S3, a stop signal indicating that the operation of the load 12 is to be stopped has been inputted into the input unit of the microcomputer 22, the control unit 83 determines that the operation of the load 12 is to be stopped. When the stop signal has not been inputted into the input unit, the control unit 83 determines that the operation of the load 12 is not to be stopped.

When the control unit 83 has determined that the operation of the load 12 is not to be stopped (S3: NO), the control unit 83 executes step S1 again. When the value of the prohibition flag is 0, the control unit 83 waits until timing at which the load 12 is to be operated or timing at which the operation of the load 12 is to be stopped arrives.

When the control unit 83 has determined to operate the load 12 (S2: YES), the control unit 83 instructs the output unit 80 to switch on the semiconductor switch 30 (step S4). When the control unit 83 has executed step S4 in a state where an off failure, where the semiconductor switch 30 is fixed in the off state, has not occurred, the driving circuit 31 switches on the semiconductor switch 30. By doing so, the wire current flows and the load 12 operates.

When the control unit 83 has determined to stop the operation of the load 12 (S3: YES), the control unit 83 instructs the output unit 80 to switch off the semiconductor switch 30 (step S5). When the control unit 83 has executed step S5 in a state where an on-failure has not occurred at the semiconductor switch 30, the drive circuit 31 switches off the semiconductor switch 30. By doing so, the wire current stops flowing and the load 12 stops operating.

After executing step S4 or step S5, the control unit 83 ends the power supply control processing. After this, the control unit 83 executes the power supply control processing again. As described above, in the power supply control apparatus 10, the supplying of power to the load 12 through the wire W is controlled via the drive circuit 31 switching the semiconductor switch 30 on or off. When the value of the prohibition flag is 1, the drive circuit 31 does not switch on the semiconductor switch 30, and the semiconductor switch 30 is kept off.

Calculation of Wire Temperature

In the wire protection processing, the control unit 83 calculates the wire temperature based on the wire current value. A method for calculating the wire temperature is described below. With respect to the wire W, the control unit 83 repeatedly calculates a temperature difference between the wire temperature and the ambient temperature of the environment in which the wire W is disposed. In more detail, the control unit 83 calculates the temperature difference based on a preceding temperature difference that was previously calculated, the ambient temperature, and the wire current value. The control unit 83 calculates the wire temperature by adding the calculated temperature difference to the ambient temperature. Ambient temperature information indicating the ambient temperature is stored in advance in the storage unit 82. When calculating the wire temperature, the ambient temperature is assumed to be a constant value.

For the wire W, the wire current value, the temperature difference to be calculated, the preceding temperature difference, and the ambient temperature are respectively denoted as "Iw", "$\Delta$Tw", "$\Delta$Tp", and "Ta". The control unit 83 calculates the temperature difference $\Delta$Tw by substituting the preceding temperature difference $\Delta$Tp, the wire current value Iw, and the ambient temperature Ta into Equations [1] and [2] below.

$$\Delta Tw = \Delta Tp \cdot \exp(-\Delta t/\tau r) + Rth \cdot Rw \cdot Iw2 \cdot (1 - \exp(-\Delta t/\tau r)) \qquad [1]$$

$$Rw = Ro \cdot (1 + \kappa \cdot (Ta + \Delta Tp - To)) \qquad [2]$$

The variables and constants used in Equations [1] and [2] are described below. This description of the variables and constants will also indicate the units of the variables or constants. The unit of the wire current value Iw is amperes. The unit of the temperature difference $\Delta$Tw, the preceding temperature difference $\Delta$Tp, and the ambient temperature Ta is degrees Celsius. Rw is the wire resistance value (in $\Omega$) of the wire W. Rth is the wire heat resistance value of the wire W (in $^\circ$ C./W). $\Delta$t is the cycle (in seconds) at which the control unit 83 acquires the current value information. $\tau$r is the wire heat radiation time constant (in seconds) of the wire W. To is a predetermined temperature (in $^\circ$ C.). Ro is the wire resistance value (in $\Omega$) at the temperature To. $\kappa$ is the wire resistance temperature coefficient (/$^\circ$ C.) of the wire W.

The temperature difference $\Delta$Tw, the preceding temperature difference $\Delta$Tp, the wire current value Iw, and the ambient temperature Ta are variables, and the cycle $\Delta$t, the wire heat radiation time constant $\tau$r, the wire thermal resistance Rth, the wire resistance Ro, the wire resistance temperature coefficient $\kappa$, and the temperature To are constants that are set in advance.

Since the value of the first term in Equation [1] decreases as the cycle $\Delta$t increases, the first term in Equation [1] represents the dissipation of heat by the wire W. Since the value of the second term in Equation [1] increases as the cycle $\Delta$t increases, the second term in Equation [1] represents the generation of heat by the wire W. The value of the second term increases as the wire current value Iw increases.

The control unit 83 calculates the wire temperature of the wire W by adding the ambient temperature Ta to the calculated temperature difference $\Delta$Tw. During the calculation of the temperature difference $\Delta$Tw of the wire W that is executed first by the control unit 83 after the microcomputer 22 starts up, the wire temperature of the wire W is assumed to match the environmental temperature Ta, and the preceding temperature difference $\Delta$Tp is regarded as zero.

Wire Protection Processing

FIG. 12 is a flowchart indicating the procedure of the wire protection processing. The control unit 83 periodically executes this wire protection processing. The storage unit 82 stores the preceding temperature difference that was previously calculated by the control unit 83. The preceding temperature difference stored in the storage unit 82 is changed by the control unit 83.

In the wire protection processing, the control unit 83 first acquires the current value information from the A/D converter unit 81 (step S11). After executing step S11, the control unit 83 reads the preceding temperature difference from the storage unit 82 (step S12). Next, the control unit 83 substitutes the wire current value indicated by the current value information acquired in step S11, the preceding temperature difference read in step S12, and the ambient temperature indicated by the ambient temperature information stored in the storage unit 82 into Equations [1] and [2] to calculate the temperature difference between the wire temperature of the wire W and the ambient temperature (step S13).

Next, the control unit 83 changes the preceding temperature difference stored in the storage unit 82 to the temperature difference calculated in step S13 (step S14). The changed preceding temperature difference will be used in the calculation of the next temperature difference. After executing step S14, the control unit 83 calculates the wire temperature by adding the temperature difference calculated in step S13 to the ambient temperature indicated by the ambient temperature information stored in the storage unit 82 (step S15).

Next, the control unit 83 determines whether the wire temperature calculated in step S15 is equal to or higher than the temperature threshold (step S16). When the control unit 83 has determined that the calculated wire temperature is equal to or higher than the temperature threshold (S16: YES), the control unit 83 instructs the output unit 80 to switch off the semiconductor switch 30 (step S17). When the control unit 83 has executed step S17 in a state where an on failure has not occurred at the semiconductor switch 30, the drive circuit 31 switches off the semiconductor switch 30. As a result, the flow of the wire current stops and the wire temperature falls.

After executing step S17, the control unit 83 changes the value of the prohibition flag to 1 (step S18). This prohibits the semiconductor switch 30 from being switched on. If the control unit 83 has determined that the wire temperature is below the temperature threshold (S16: NO), or after step S18 has been executed, the control unit 83 ends the wire protection processing. When the next cycle arrives, the control unit 83 executes the wire protection processing again.

As described above, the control unit 83 repeatedly calculates the wire temperature based on the wire current value. When the wire temperature has reached a temperature that is equal to or higher than the temperature threshold, the control unit 83 instructs the output unit 80 to switch off the semiconductor switch 30 and prohibits the semiconductor switch 30 from switching on. When the semiconductor switch 30 is switched off, the wire temperature drops. The wire temperature when smoke is emitted from the wire W is indicated as the "smoking temperature". The temperature threshold is below this smoking temperature. This means that the wire W is protected from smoking.

When the value of the prohibition flag has been changed to 1, the control unit 83 may execute release processing to return the value of the prohibition flag to 0. When the value of the prohibition flag is 1, the control unit 83 periodically executes the release processing. During this release processing also, the control unit 83 calculates the temperature difference between the wire temperature and the ambient temperature. As one example, the control unit 83 determines whether the calculated temperature difference is equal to or below a predetermined value. When it has been determined that the calculated temperature difference is equal to or below the predetermined value, the control unit 83 changes the value of the prohibition flag from 1 to 0. The predetermined value is 0° C., or 5° C. or the like.

Timings Relating To Blowing, Cutoff, and Smoking

FIG. 13 is a timing chart relating to blowing, cutoff, and smoking. FIG. 13 depicts the cutoff characteristics of the semiconductor switch 30, the blowing characteristics of the fuse 20, and the smoking characteristics of the wire W. For these characteristics, the vertical axis represents the wire current value and the horizontal axis represents a period, that is, a length of time. "Is" indicates a freely chosen wire current value. "T1" indicates the period corresponding to "Is" in the cutoff characteristics. "T2" indicates the period corresponding to "Is" in the blowing characteristics. "T3" indicates the period corresponding to "Is" in the smoking characteristics.

The cutoff characteristics indicate the timing at which the drive circuit 31 switches off the semiconductor switch 30 because the wire temperature calculated by the control unit 83 has risen to a temperature that is equal to or higher than the temperature threshold. When the period for which a wire current with the wire current value Is has continuously flowed reaches T1, the drive circuit 31 switches off the semiconductor switch 30. The smaller the wire current value Is, the longer the period T1.

The blowing characteristics indicate the timing at which the fusing portion 42 of the fuse 20 blows. When the period for which the wire current with the wire current value Is has continuously flowed reaches T2, the fuse temperature reaches the blowing temperature and the fuse 20 blows. As mentioned earlier, when the fuse temperature reaches the blowing temperature, the wire temperature reaches the reference temperature. The smaller the wire current value Is, the longer the period T2.

The following are examples of the timing at which the fusing portion 42 of the fuse 20 will blow when a fuse with a rated current value of 20 A is used as the fuse 20. When a current with a current value of 27 A has continued to flow through the fuse 20 for 60 seconds, the fusing portion 42 of the fuse 20 will blow. When a current with a current value of 40 A has continuously flowed through the fuse 20 for 1.5 seconds, the fuse 20 will blow.

The smoking characteristics indicate the timing at which the wire W starts smoking. When the period for which a current with the wire current value Is has continuously flowed through the wire W reaches T3, the wire temperature reaches the smoking temperature and the wire W starts smoking. The smaller the wire current value Is, the longer the period T3.

As depicted in FIG. 13, for any freely chosen wire current value Is, the period T3 is longer than the periods T1 and T2. This means that the smoking temperature of the wire W is higher than the reference temperature and the temperature threshold of the wire W. As mentioned earlier, the reference temperature is the wire temperature when the fuse temperature is the blowing temperature. Since the smoking temperature is higher than the reference temperature and the temperature threshold, the semiconductor switch 30 will be switched off or the fuse 20 will blow before the wire temperature reaches the smoking temperature. This means that the wire W is protected from smoking.

Also, for any freely chosen wire current value Is, the period T2 is longer than the period T1. The period T2 being longer than the period T1 means that the reference temperature of the wire W exceeds the temperature threshold of the wire temperature. When the semiconductor switch 30 is on, unless an on failure occurs at the semiconductor switch 30, the wire temperature will reach a temperature that is equal to or higher than the temperature threshold before the fusing portion 42 of the fuse 20 blows. When the wire temperature has reached or exceeded the temperature threshold, the drive circuit 31 switches off the semiconductor switch 30. Accordingly, when an on failure has not occurred at the semiconductor switch 30, the fusing portion 42 of the fuse 20 will not blow. When an on failure has occurred at the semiconductor switch 30, the fuse 20 will blow before the wire temperature reaches the smoking temperature.

Second Embodiment

In the first embodiment, the fuse 20 is disposed upstream of the semiconductor switch 30 on a current path of the wire current. However, the installed location of the fuse 20 is not limited to being upstream of the semiconductor switch 30.

The following description focuses on how the second embodiment differs from the first embodiment. Configurations other than those described below are the same as those of the first embodiment. For this reason, the same reference numerals as in the first embodiment have been assigned to components that are the same as in the first embodiment and description of such components is omitted.

Configuration of Power Supply System 1

Figure 14:
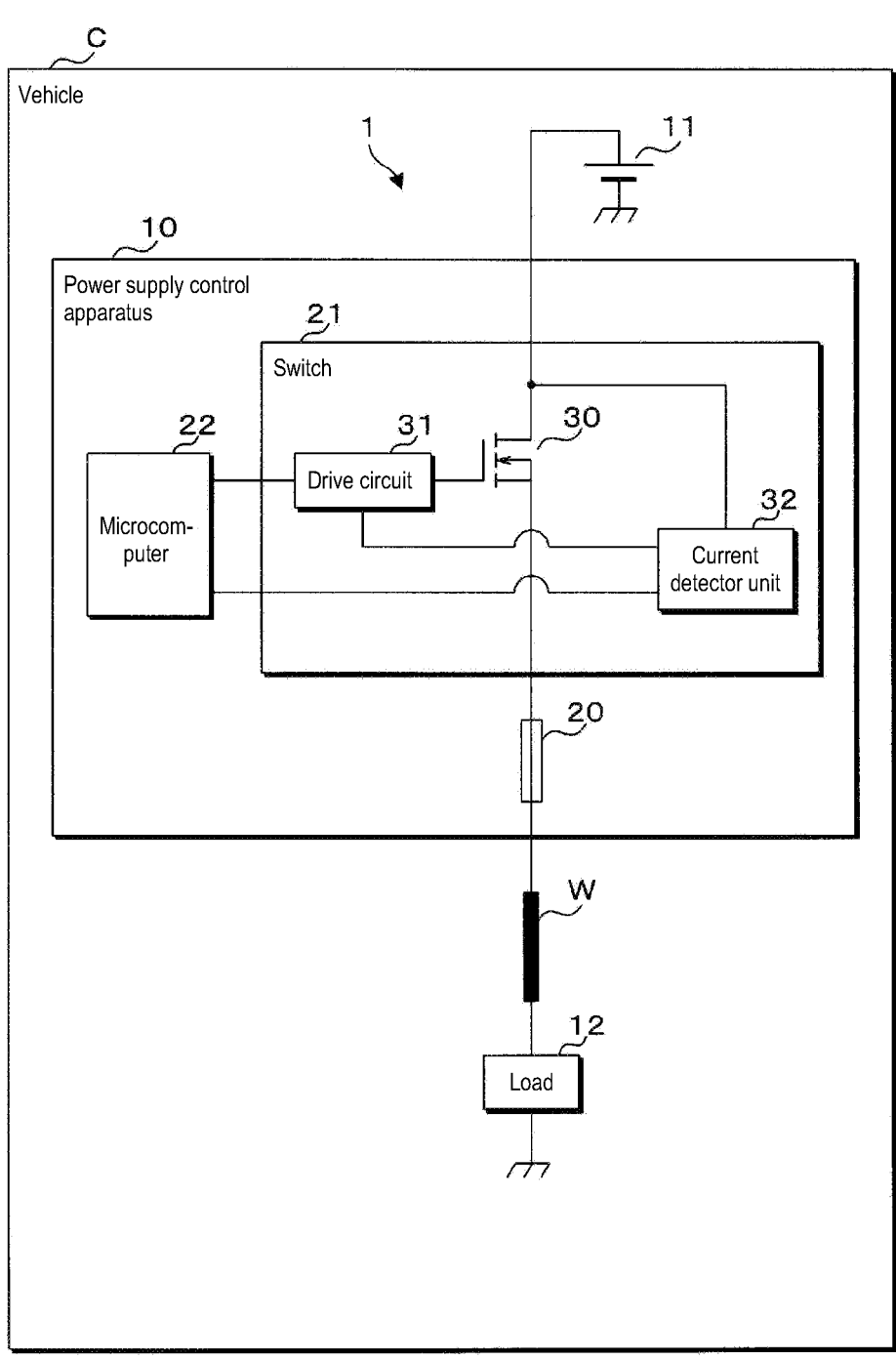
FIG. 14 is a block diagram depicting the configuration of a principal part of a power supply system according to a second embodiment.

FIG. 14 is a block diagram depicting the configuration of a principal part of the power supply system 1 according to the second embodiment. In this second embodiment, the positive electrode of the DC power supply 11 is connected to the drain of the semiconductor switch 30. The source of the semiconductor switch 30 is connected to one terminal 41 of the fuse 20. The other terminal 41 of the fuse 20 is connected to one end of the wire W. When the semiconductor switch 30 is on, the wire current flows from the positive electrode of the DC power supply 11 through the semiconductor switch 30, the fuse 20, the wire W, and the load 12 in that order. The fuse 20 is disposed downstream of the semiconductor switch 30 on the current path of the wire current. The wire W is disposed downstream of the fuse 20 on the current path.

The power supply control apparatus 10 according to the second embodiment has the same effects as the power supply control apparatus 10 according to the first embodiment.

Third Embodiment

In the second embodiment, the method by which the current detector unit 32 generates the analog current value information is not limited to a method of using a current drawn from the drain of the semiconductor switch 30.

The following description focuses on how the third embodiment differs from the second embodiment. Configurations other than those described below are the same as those of the second embodiment. For this reason, the same reference numerals as in the second embodiment have been assigned to components that are the same as in the second embodiment and description of such components is omitted.

Configuration of Power Supply System 1

Figure 15:
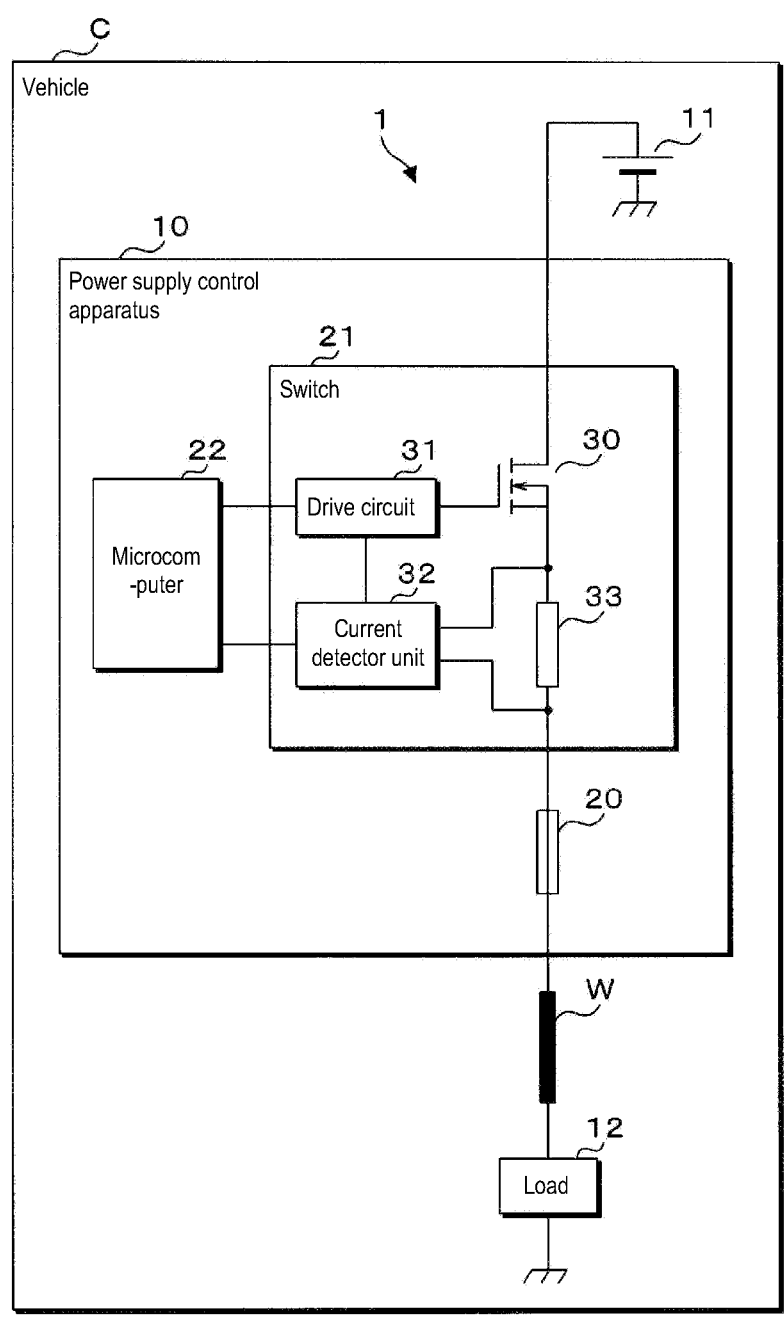
FIG. 15 is a block diagram depicting the configuration of a principal part of a power supply system according to a third embodiment.

FIG. 15 is a block diagram depicting the configuration of a principal part of the power supply system 1 according to the third embodiment. When the second and third embodiments are compared, the configuration of the switching device 21 differs. The switching device 21 according to the third embodiment includes a shunt resistor 33 in addition to the semiconductor switch 30, the drive circuit 31, and the current detector unit 32. The shunt resistor 33 is connected between the source of the semiconductor switch 30 and the upstream-side terminal 41 of the fuse 20. The current detector unit 32 is connected to one end and the other end of the shunt resistor 33 in place of the drain of the semiconductor switch 30.

When the semiconductor switch 30 is on, the wire current flows from the positive electrode of the DC power supply 11 through the semiconductor switch 30, the shunt resistor 33, the fuse 20, the wire W, and the load 12 in that order. The current detector unit 32 detects the voltage value across both ends of the shunt resistor 33. The voltage value across both ends of the shunt resistor 33 is represented by (wire current value)·(resistance value of the shunt resistor 33). Here, the symbol "·" indicates the product. The resistance value of the shunt resistor 33 is a constant. This means that the voltage value across both ends of the shunt resistor 33 indicates the wire current value. Based on the voltage value across both ends of the shunt resistor 33, the current detection unit 32 generates analog current value information indicating the wire current value. The current detector unit 32 outputs analog current value information to the A/D converter unit 81 of the microcomputer 22 and the drive circuit 31 in the same way as in the second embodiment.

The power supply control apparatus 10 according to the third embodiment has the same effects as the power supply control apparatus 10 according to the second embodiment.

Note that the switching device 21 of the power supply control apparatus 10 according to the first embodiment may be configured in the same way as in the third embodiment. The switching device 21 in the third embodiment differs from an IPD configuration.

Fourth Embodiment

In the third embodiment, the voltage value detected by the current detector unit 32 is not limited to the voltage value across both ends of the shunt resistor 33.

The following description focuses on how the fourth embodiment differs from the third embodiment. Configurations other than those described below are the same as those of the third embodiment. For this reason, the same reference numerals as in the third embodiment have been assigned to components that are the same as in the third embodiment and description of such components is omitted.

Configuration of Power Supply System 1

Figure 16:
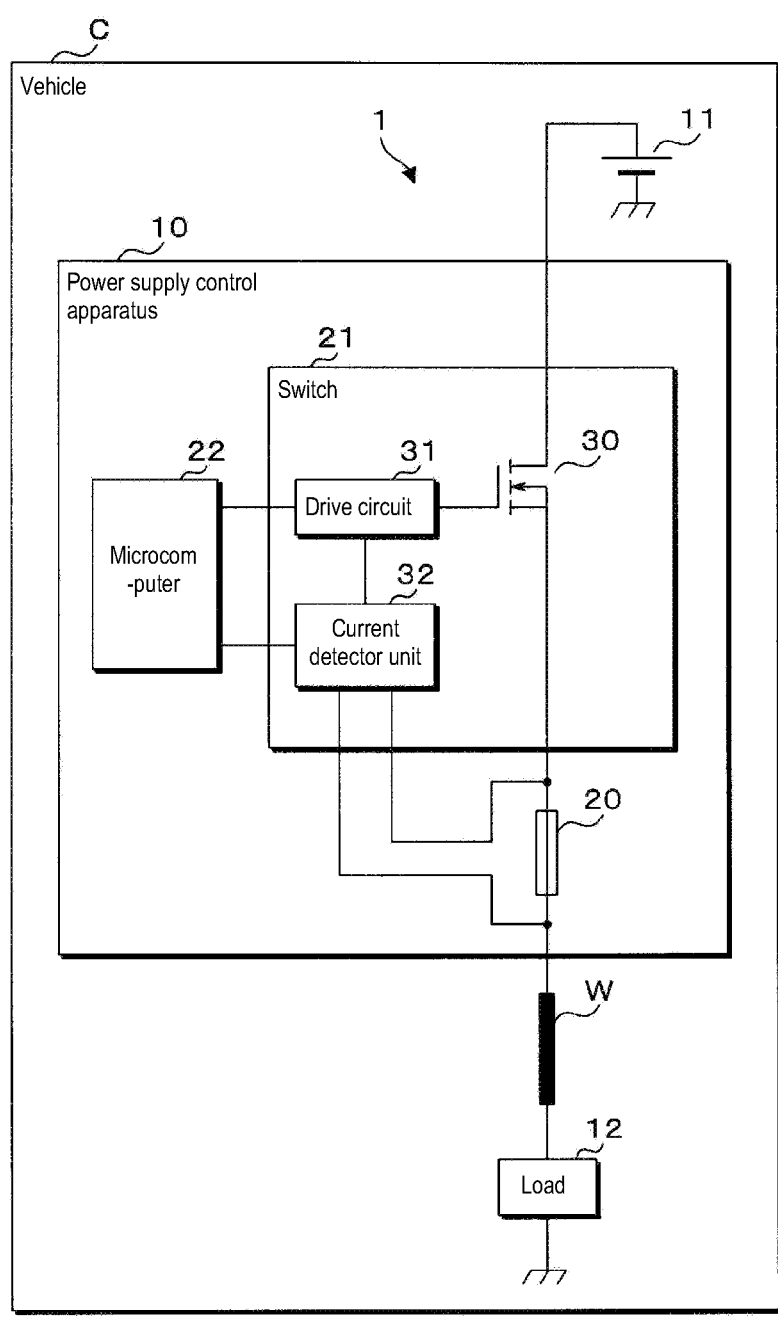
FIG. 16 is a block diagram depicting the configuration of a principal part of a power supply system according to a fourth embodiment.

FIG. 16 is a block diagram depicting the configuration of a principal part of the power supply system 1 according to the fourth embodiment. When the third and fourth embodiments are compared, the configuration of the switching device 21 of the power supply control apparatus 10 differs. In the same way as in the third embodiment, the switching device 21 in the fourth embodiment includes the semiconductor switch 30, the drive circuit 31, and the current detector unit 32. However, the switching device 21 according to the fourth embodiment does not include the shunt resistor 33. The current detector unit 32 is connected separately to the two terminals 41 of the fuse 20.

As described in the first embodiment, at the fuse 20, a current flows through a terminal 41, the fusing portion 42, and a terminal 41 in that order. The fusing portion 42 has a resistance component. A voltage value across both ends of the fusing portion 42 is referred to here as the "voltage across both ends". The current detector unit 32 detects the voltage across both ends of the fusing portion 42. The fuse 20 also functions as the shunt resistor 33 in the third embodiment. The voltage across both ends of the fusing portion 42 is expressed by (wire current value)·(resistance value of the fusing portion 42). This means that the voltage across both ends of the fusing portion 42 indicates the wire current value. The current detection unit 32 generates the analog current value information indicating the wire current value based on the voltage across both ends of the fusing unit 42. In the same way as in the third embodiment, the current detector unit 32 outputs analog current value information to the A/D converter unit 81 of the microcomputer 22 and the drive circuit 31.

The higher the wire current value, the higher the voltage across both ends of the fusing portion 42. The voltage across both ends of the fusing portion 42 when the wire current value is the current threshold is referred to as a "predetermined voltage value". When the voltage across both ends of the fusing portion 42 is less than the predetermined voltage value, the wire current value is less than the current threshold. When the voltage across both ends of the fusing portion 42 is equal to or higher than the predetermined voltage value, the wire current value is equal to or higher than the current threshold.

Accordingly, when the voltage across both ends of the fusing portion 42 is below the predetermined voltage value, the driving circuit 31 switches the semiconductor switch 30 on or off according to the output voltage of the output unit 80 of the microcomputer 22 in the same way as in the second embodiment, that is, the first embodiment. When the voltage across both ends of the fusing portion 42 becomes equal to or higher than the predetermined voltage value, the drive circuit 31 switches off the semiconductor switch 30 regardless of the output voltage of the output unit 80. By doing so, an excessive wire current is prevented from flowing. After switching off the semiconductor switch 30 regardless of the output voltage of the microcomputer 22, the drive circuit 31 keeps the semiconductor switch 30 off until a predetermined condition is satisfied in the same way as in the second embodiment, that is, the first embodiment.

In the fourth embodiment, the wire current value indicated by the current value information is a value based on the voltage across both ends of the fusing portion 42. Accordingly, in step S13 of the wire protection processing, the control unit 83 calculates the temperature difference based on the voltage across both ends of the fusing portion 42. In step S15 of the wire protection processing, the control unit 83 calculates the wire temperature based on the temperature difference calculated in step S13. As described in the first embodiment, the control unit 83 periodically executes the wire protection processing. As a result, the control unit 83 repeatedly calculates the wire temperature based on the voltage across both ends of the fusing portion 42.

The control unit 83 executes step S17 when the calculated wire temperature is equal to or higher than the temperature threshold. When the control unit 83 has executed step S17 in a state where an on failure has not occurred at the semiconductor switch 30, the drive circuit 31 switches off the semiconductor switch 30. The power supply control apparatus 10 according to the fourth embodiment has the same effects as the power supply control apparatus 10 according to the second embodiment. Note that the switching device 21 in the fourth embodiment differs from an IPD configuration.

Fifth Embodiment

In the first embodiment, the microcomputer 22 is included in the power supply control apparatus 10. However, the configuration of the power supply control apparatus 10 may be a configuration that does not include the microcomputer 22.

The following description focuses on how the fifth embodiment differs from the first embodiment. Configurations other than those described below are the same as those of the first embodiment. For this reason, the same reference numerals as in the first embodiment have been assigned to components that are the same as in the first embodiment and description of such components is omitted.
Configuration of Power Supply System 1

Figure 17:
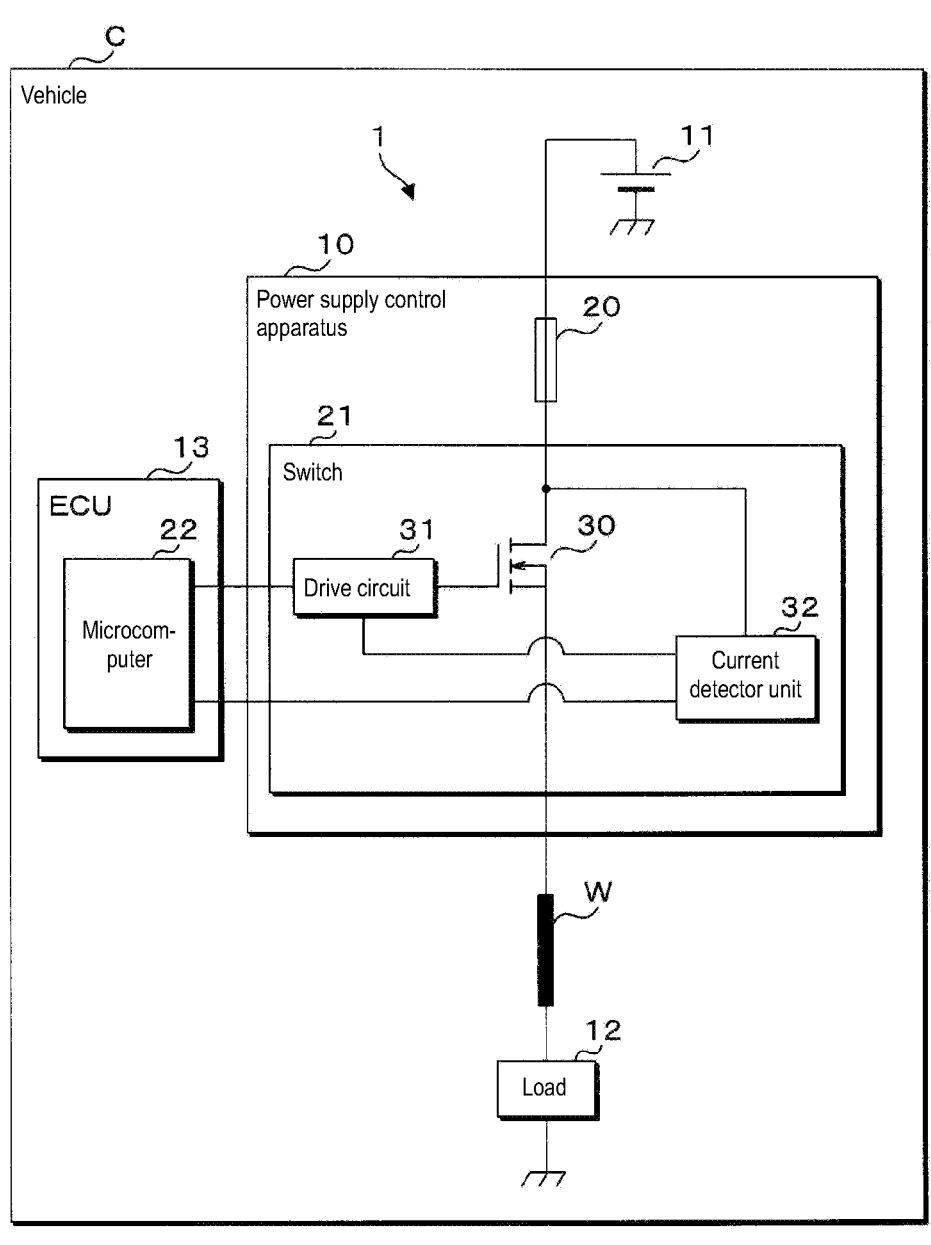
FIG. 17 is a block diagram depicting the configuration of a principal part of a power supply system according to a fifth embodiment.

FIG. 17 is a block diagram depicting the configuration of a principal part of the power supply system 1 according to the fifth embodiment. In the same way as the first embodiment, the power supply system 1 according to the fifth embodiment includes a power supply control apparatus 10, a DC power supply 11, and a load 12. The power supply system 1 according to the fifth embodiment further includes an ECU (Electronic Control Unit) 13. In the fifth embodiment, the microcomputer 22 is not included in the power supply control apparatus 10 and is instead included in the ECU 13. The microcomputer 22 is connected in the same way as in the first embodiment.

The power supply control apparatus 10 and the ECU 13 according to the fifth embodiment have the same effects as the power supply control apparatus 10 according to the first embodiment.

Note that the power supply systems 1 according to each of the first to fourth embodiments may also include the ECU 13. In this case, in the same way as in the fifth embodiment, the microcomputer 22 is not included in the power supply control apparatus 10 and is instead included in the ECU 13.
Modifications In the first to fifth embodiments, the number of circuits that include the fuse 20, the switching device 21, the wire W, and the load 12 is not limited to one, and may be two or more. For configurations where the number of circuits is two or higher, when the semiconductor switches 30 of all the switches 21 are on, the current outputted from the positive electrode of the DC power supply 11 is divided into a plurality of currents. These plurality of currents are inputted into the plurality of switches 21. In each circuit, the current flows through the fuse 20, the semiconductor switch 30, and the wire W.

Each of the plurality of switches 21 outputs current information indicating the wire current value to the microcomputer 22. The control unit 83 of the microcomputer 22 executes the power supply control processing and the wire protection processing for each of the plurality of circuits.

In the first embodiment, the number of terminals 41 provided on the fuse 20 is not limited to two, and may be three or more. As one example, when the fuse 20 has three terminals 41, the three terminals 41 are arranged in a row in the left-right direction with the plate surfaces in alignment. One fusing portion 42 is connected to the terminal 41 on the left and the terminal 41 in the center. Another fusing portion 42 is connected to the terminal 41 in the center and the terminal 41 on the right. The positive electrode of the DC power supply 11 is connected to the center terminal 41. When the fuse 20 has three terminals 41, the power system 1 will include two loads 12. Two electric wires W are connected to each of the two loads 12. The power supply control apparatus 10 includes two semiconductor switches 30 and two drive circuits 31.

The drain, source, and gate of one semiconductor switch 30 are connected to the left terminal 41 of the fuse 20, one end of one wire W, and one drive circuit 31, respectively. The other end of the wire W is connected to one end of one load 12. The drain, source, and gate of the other semiconductor switch 30 are connected to the right terminal 41 of the fuse 20, one end of the other wire W, and the other drive circuit 31, respectively. The other end of the wire W is connected to one end of the other load 12. The other ends of the two loads 12 are grounded.

When one semiconductor switch 30 is on, a current flows from the positive electrode of the DC power supply 11 to one fusing portion 42 of the fuse 20, one semiconductor switch 30, one wire W, and one load 12 in that order. When the other semiconductor switch 30 is on, a current flows from the positive electrode of the DC power supply 11 to the other fusing portion 42 of the fuse 20, the other semiconductor switch 30, the other wire W, and the other load 12 in that order. The microcomputer 22 outputs a high level voltage or a low level voltage to each of the two drive circuits 31. Each of the two drive circuits 31 switches the two semiconductor switches 30 on or off according to the output voltage of the microcomputer 22. By doing so, the supplying of power to the two loads 12 is controlled separately. The two drive circuits 31 switch off the two semiconductor switches 30 based on the respective wire current values of the two wires W. Each of the microcomputers 22 switches the voltage outputted to the two drive circuits 31 to a low level voltage according to the respective wire temperatures of the two wires W.

In the first to fifth embodiments, the semiconductor switch 30 is not limited to an N-channel FET. The semiconductor switch 30 may be a P-channel FET, a bipolar transistor, or the like. In the third and fourth embodiments, the fuse 20 may be disposed between the positive electrode of the DC power supply 11 and the drain of the semiconductor switch 30 in the same way as in the first embodiment.

In the first to fifth embodiments, the wire temperature of the wire W may be detected using a sensor, for example. In this case, the control unit 83 of the 5 microcomputer 22 does not need to calculate the wire temperature. In the wire protection processing, the control unit 83 instructs the output unit 80 to switch off the semiconductor switch 30 and changes the value of the prohibition flag to 1 when the wire temperature is equal to or higher than the temperature threshold.

All features of the first to fifth embodiments disclosed here are exemplary and should not be regarded as limitations on the present disclosure. The scope of the present disclosure is indicated by the range of the patent claims, not the description given above, and is intended to include all changes within the meaning and scope of the patent claims and their equivalents.

The invention claimed is:

1. A power supply control apparatus that controls supplying of power through a wire, the power supply control apparatus comprising:
   a fuse and a semiconductor switch disposed on a current path of a wire current that flows through the wire;
   a circuit board to which the fuse and the semiconductor switch are attached; and
   a processing unit for executing processing,
   wherein the fuse includes:
       a plurality of terminals that are connected to the circuit board by solder; and
       a fusing portion connected between two terminals out of the plurality of terminals, the two terminals out of the plurality of terminals are disposed on the current path, the fusing portion blows according to a temperature of the fusing portion, and the processing unit issues an instruction to switch off the semiconductor switch according to a wire temperature of the wire.

2. The power supply control apparatus according to claim 1, wherein the processing unit issues the instruction to switch off the semiconductor switch when the wire temperature has become a temperature threshold or higher, and
   when the semiconductor switch is on, the wire temperature reaches the temperature threshold or higher before the fusing portion blows.

3. The power supply control apparatus according to claim 1, wherein the fuse includes a housing that covers part of the plurality of terminals and the fusing portion, and
   the housing is resistant to a temperature of 300 degrees Celsius or higher.

4. The power supply control apparatus according to claim 1, wherein the circuit board includes:
   an insulating board;

a plurality of through holes that pass through the insulating board, and
   a plurality of pieces of board plating that cover the insulating board;
   the plurality of terminals of the fuse are inserted into a plurality of through holes, and are connected by the solder to the plurality of pieces of board plating on the circuit board.

5. The power supply control apparatus according to claim 1, wherein the plurality of terminals each include:
   a metal body; and
   terminal plating that is made of tin and covers a surface of the metal body.

6. The power supply control apparatus according to claim 1, further comprising a switching circuit for switching the semiconductor switch on or off,
   wherein the switching circuit switches the semiconductor switch off when a voltage across both ends of the fusing portion of the fuse has reached a predetermined temperature or higher.

7. The power supply control apparatus according to claim 1, wherein the processing unit repeatedly calculates the wire temperature based on a voltage value across both ends of the fusing portion of the fuse.

8. The power supply control apparatus according to claim 1, wherein the fuse includes a housing that covers a part of the plurality of terminals and the fusing portion, and
   each of the plurality of terminals includes a first plate part in a shape of a long plate that is partially covered by the housing and a second plate part connected to the first plate part, and wherein for each of the plurality of terminals,
   one end of the first plate part protrudes from a same one face of the housing,
the second plate part protrudes from a part of a front end face of the first plate part that protrudes from the housing,
   the circuit board includes a plurality of through holes, the second plate parts of the plurality of terminals are inserted into the plurality of through holes, and
   the first plate parts of the plurality of terminals contact the circuit board.

*    *    *    *    *